(12) United States Patent
Lee et al.

(10) Patent No.: US 9,168,856 B2
(45) Date of Patent: Oct. 27, 2015

(54) HYBRID SEAT FRAME FOR VEHICLE

(71) Applicant: LOTTE CHEMICAL CORPORATION, Seoul (KR)

(72) Inventors: Kyo Min Lee, Sokcho-si (KR); Jong Wook Lee, Daejeon (KR); Choul Won So, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/555,962

(22) Filed: Nov. 28, 2014

(65) Prior Publication Data
US 2015/0145313 A1    May 28, 2015

(30) Foreign Application Priority Data
Nov. 27, 2013 (KR) ......................... 10-2013-0145672

(51) Int. Cl.
*B60N 2/68* (2006.01)
*B29C 70/00* (2006.01)
*B29C 45/14* (2006.01)

(52) U.S. Cl.
CPC ................ *B60N 2/682* (2013.01); *B29C 45/14* (2013.01); *B29C 70/00* (2013.01); *B60N 2/68* (2013.01); *B60N 2/686* (2013.01)

(58) Field of Classification Search
CPC .......... B60N 2/682; B60N 2/68; B60N 2/686; B29C 70/00; B29C 45/14
USPC ...................................................... 297/452.18
See application file for complete search history.

(56) References Cited

U.S. PATENT DOCUMENTS

| 6,074,004 | A  | * | 6/2000 | Carmichael | .............. 297/216.14 |
| 6,170,898 | B1 | * | 1/2001 | Cunningham et al. | ..... 296/65.16 |
| 6,398,300 | B1 | * | 6/2002 | Young | ........................ 297/216.13 |
| 6,896,324 | B1 | * | 5/2005 | Kull et al. | .................. 297/216.1 |
| 2001/0006302 | A1 | * | 7/2001 | Nagayasu et al. | ........ 297/440.15 |
| 2008/0038569 | A1 | * | 2/2008 | Evans et al. | ................. 428/474.9 |
| 2014/0084661 | A1 | * | 3/2014 | Awata et al. | ............. 297/452.18 |
| 2015/0044419 | A1 | * | 2/2015 | Carson et al. | .................. 428/138 |

FOREIGN PATENT DOCUMENTS

| KR | 10-0321425 | 1/2002 |
| KR | 10-1013904 | 2/2011 |
| KR | 10-2013-0099964 | 9/2013 |

* cited by examiner

*Primary Examiner* — Milton Nelson, Jr.
(74) *Attorney, Agent, or Firm* — Paratus Law Group, PLLC

(57) ABSTRACT

The present invention relates to a hybrid seat frame for a vehicle and provides a hybrid seat frame for a vehicle including a main frame formed of glass fiber and a reinforced frame formed of carbon fiber to secure stiffness in a direction perpendicular to the longitudinal direction and torsional stiffness and to reduce its weight, thereby improving fuel efficiency of the vehicle.

1 Claim, 7 Drawing Sheets

(a)

(b)

HYBRID SEAT FRAME FOR VEHICLE

CROSS REFERENCE TO PRIOR APPLICATION

The present application claims priority under 35 U.S.C. §119 to Korean Patent Application No. 10-2013-0145672 (filed on Nov. 27, 2013), which is hereby incorporated by reference in its entirety.

BACKGROUND OF THE INVENTION

1. Field of the Invention

The present invention relates to a hybrid seat frame for a vehicle and, more particularly, to a hybrid seat frame for a vehicle which is capable of reducing weight thereof while securing sufficient stiffness.

2. Description of the Related Art

In general, a seat of a vehicle is a part for passenger seating and includes a seat frame fixed to a vehicle body and a cover surrounding the seat frame.

However, since conventional seat frames are formed of metallic materials, such as steel, a vehicle increases in total weight and deteriorated in fuel efficiency. Accordingly, all automobile manufacturers and related companies are being focused on development of a lightweight seat frame having high stiffness.

In detail, in the field of steel seat frames, although efforts have been made to develop a lightweight seat frame having high stiffness by applying various forming methods, such as hydro-forming, the steel seat frame additionally increases in price for its performance. On the other hand, since a seat frame formed of a polymer composite has superior specific strength and specific stiffness, it is expected that the seat frame is manufactured to be lightweight as well as has no additional cost increase. As a result, many companies are participating in the development.

However, composite seat frames developed so far have superior properties against a load in a direction perpendicular to a longitudinal direction, but do not have very weak properties against a torsional load.

For reference, the conventional art related to the present invention is disclosed in Korean Patent No. 10-0321425, Korean Patent No. 10-1013904, etc.

SUMMARY OF THE INVENTION

The present invention provides a hybrid seat frame for a vehicle, which has a superior specific strength and specific stiffness, allows a reduction in fuel efficiency through a weight reduction and also allows a mass-production with a low cost.

According to an aspect of the present invention, a hybrid seat frame for a vehicle includes: a main frame formed of glass fiber; and a reinforcing frame coupled to the main frame and formed of carbon fiber.

The glass fiber may be formed of a polyamide base material and glass short fiber reinforcing material, and the carbon fiber may include a thermoplastic acryl base material and a continuous carbon fiber reinforcing material.

Each of the main frame and the reinforced frame may have a ⊏-shaped cross-section.

Reinforcing ribs may be formed on an inner circumference of the main frame.

The main frame may be inserted into an inner circumference of the reinforcing frame.

The main frame and the reinforced frame may be fastened to each other by a rivet.

A fastener may be formed in a portion at which the main frame and the reinforced frame are fastened to each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
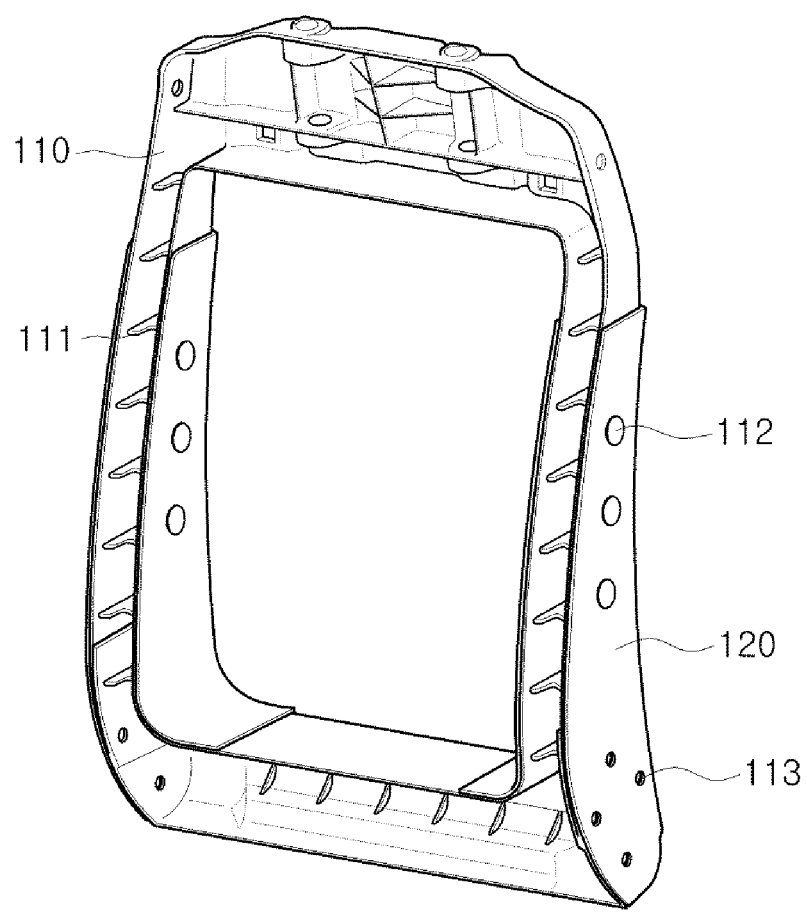
FIG. 1 is a perspective view of a hybrid seat frame for a vehicle according to an exemplary embodiment of the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

Figure 2:
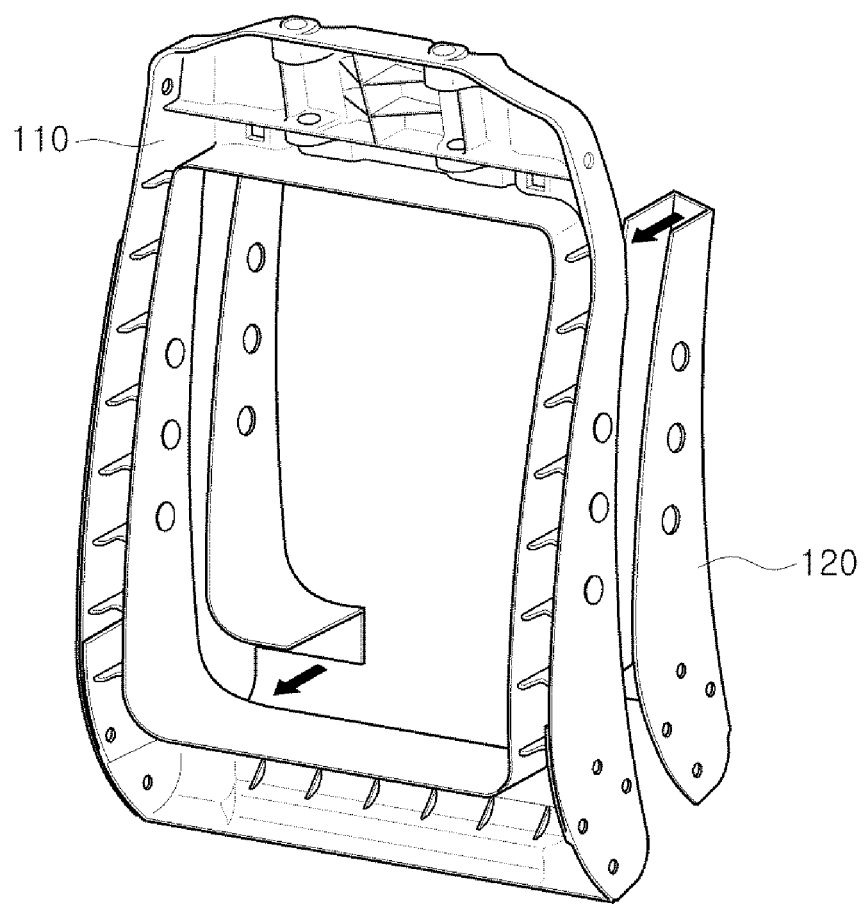
FIG. 2 is an exploded perspective view of a hybrid seat frame for the vehicle illustrated in FIG. 1.
Figure 3:
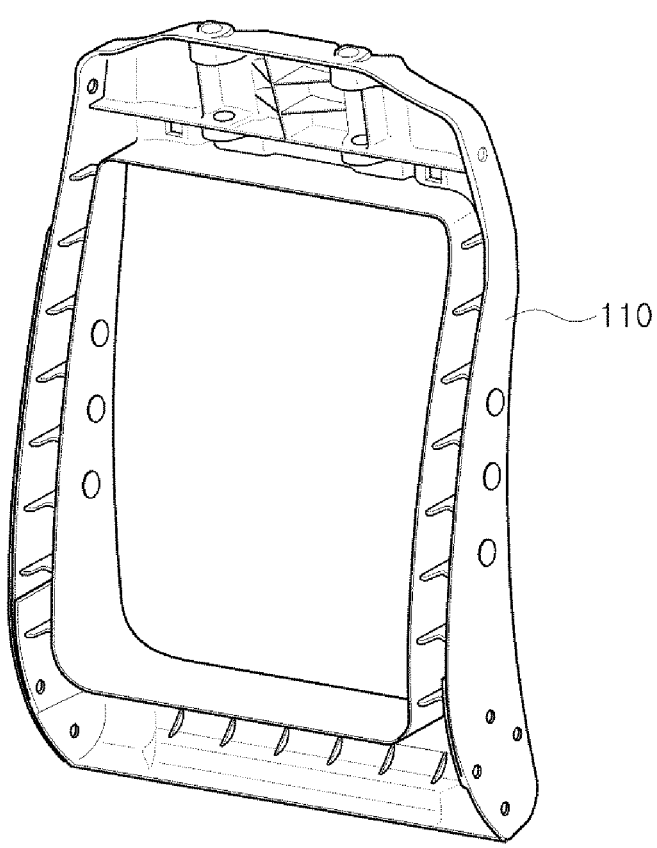
FIG. 3 is a perspective view of a main frame and a reinforcing frame constituting the hybrid seat frame for the vehicle illustrated in FIG. 1.
Figure 3:
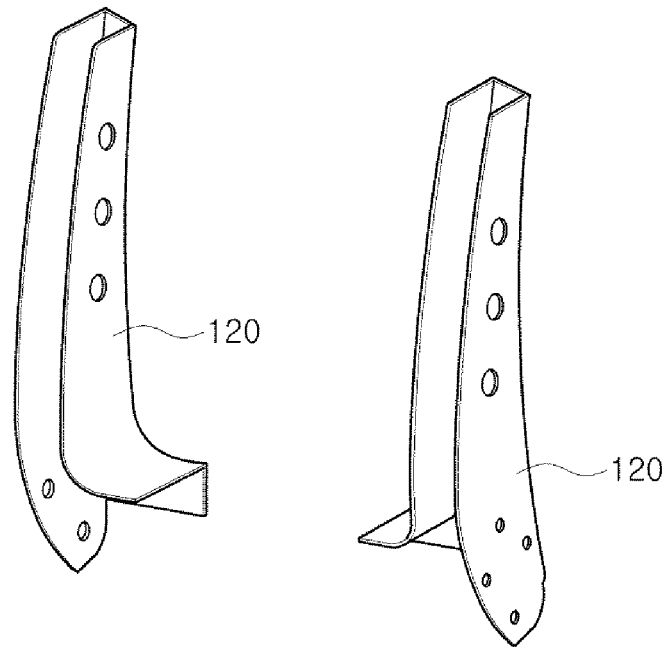
Figure 4:
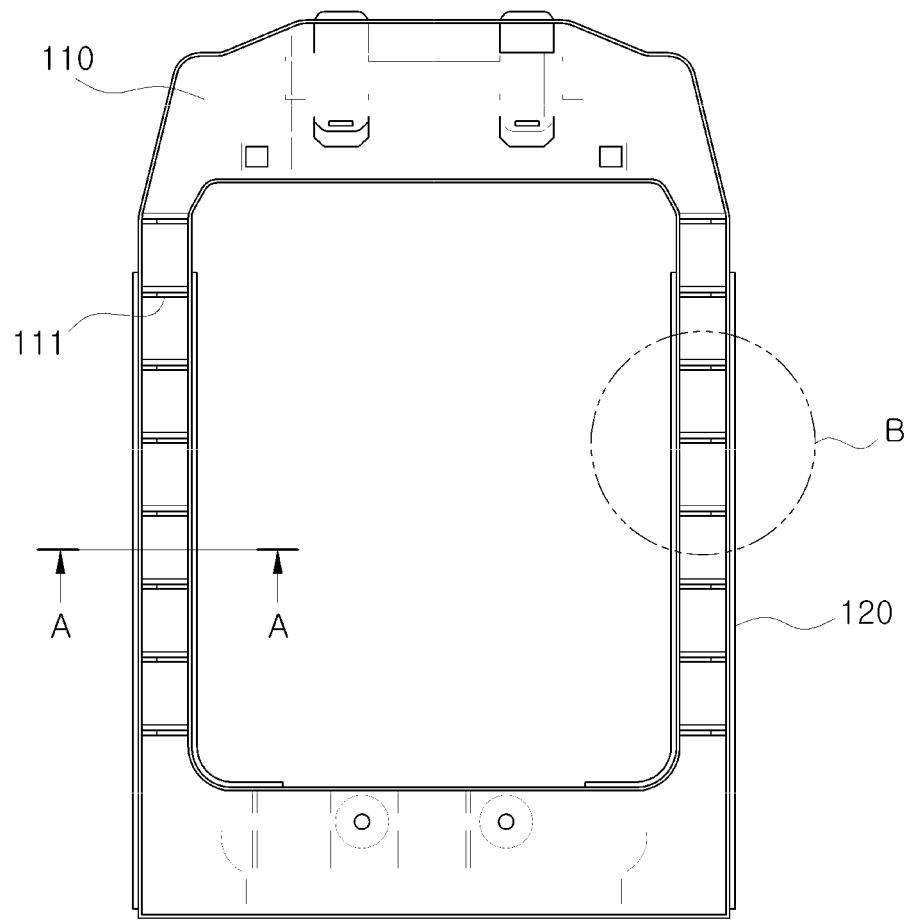
FIG. 4 is a front view of the hybrid seat frame for the vehicle illustrated in FIG. 1.
Figure 5:
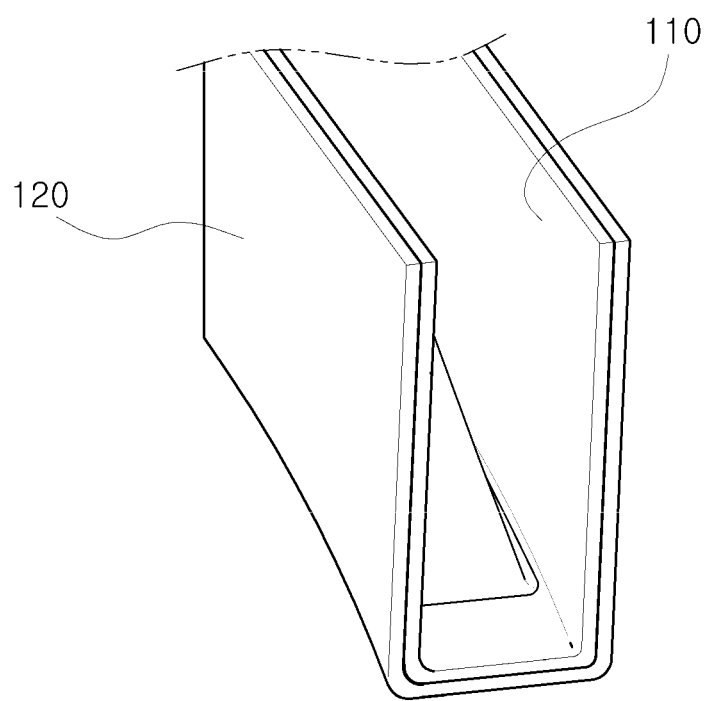
FIG. 5 is a perspective cross-sectional view taken along line A-A of the hybrid seat frame for the vehicle illustrated in FIG. 4.
Figure 6:
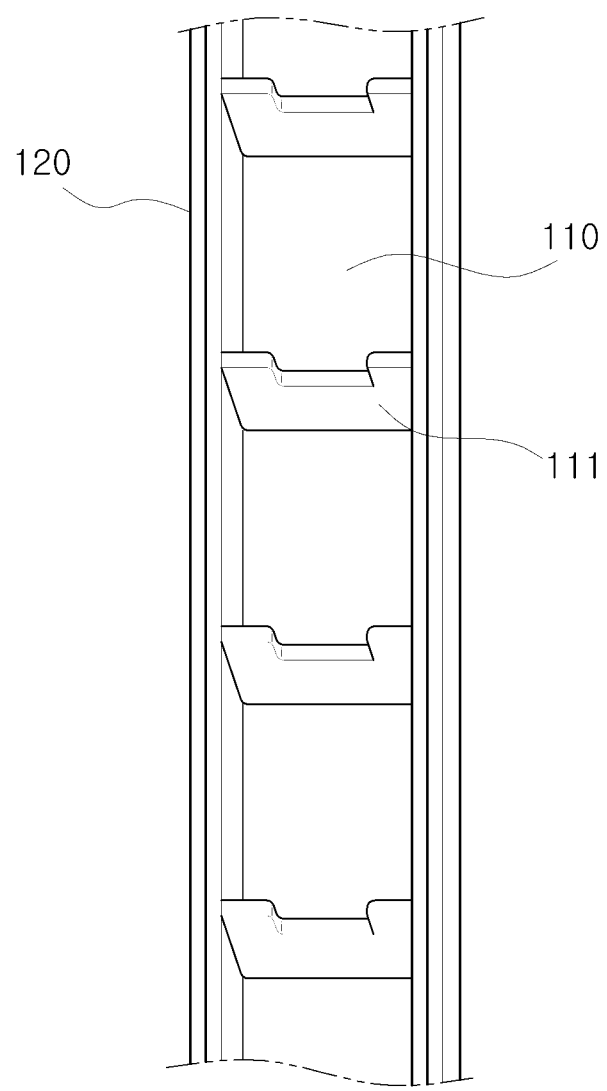
FIG. 6 is an enlarged view of a portion B of the hybrid seat frame for the vehicle illustrated in FIG. 4.
Figure 7:
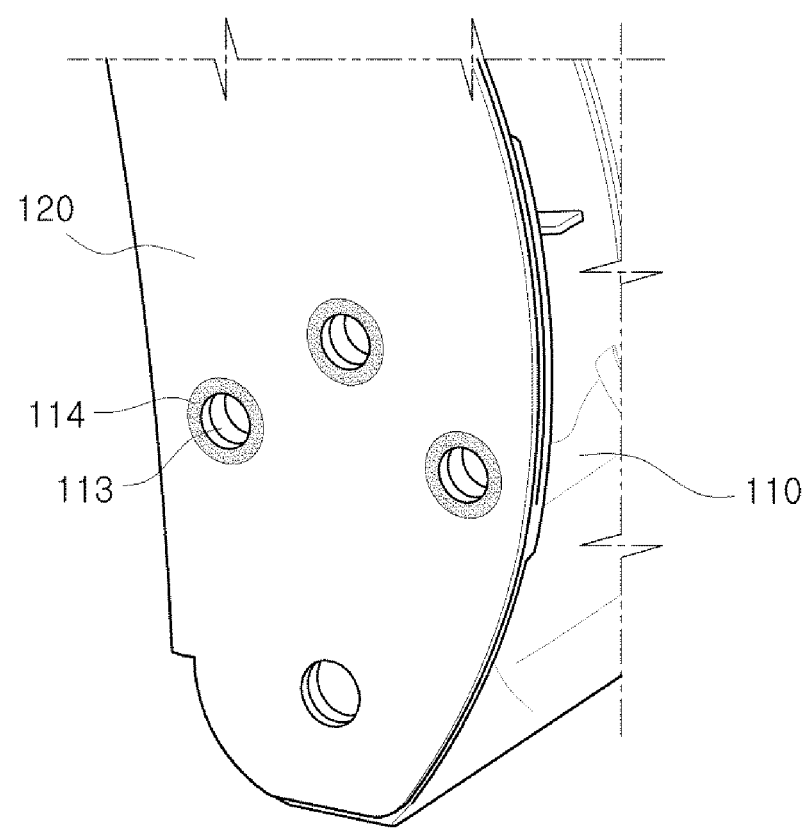
FIG. 7 is an enlarged view illustrating a mounting part of the hybrid seat frame for the vehicle illustrated in FIG. 1.

FIG. 1 is a perspective view of a hybrid seat frame for a vehicle according to an exemplary embodiment of the present invention, FIG. 2 is an exploded perspective view of a hybrid seat frame for the vehicle illustrated in FIG. 1, FIG. 3 is a perspective view of a main frame and a reinforcing frame constituting the hybrid seat frame for the vehicle illustrated in FIG. 1, FIG. 4 is a front view of the hybrid seat frame for the vehicle illustrated in FIG. 1, FIG. 5 is a perspective cross-sectional view taken along line A-A of the hybrid seat frame for the vehicle illustrated in FIG. 4, FIG. 6 is an enlarged view of a portion B of the hybrid seat frame for the vehicle illustrated in FIG. 4, and FIG. 7 is an enlarged view illustrating a mounting part of the hybrid seat frame for the vehicle illustrated in FIG. 1.

Referring to FIGS. 1 to 7, a hybrid seat frame for a vehicle 100 according to an exemplary embodiment of the present invention includes a main frame 110 and a reinforcing frame 120.

The main frame 110 supports a major load exerted from outside and has an approximately S-shaped streamline shape so as to stably support the waist and back of a passenger.

In the present invention, the main frame 110 is formed of a glass fiber, and more particularly, is formed of a glass fiber in which about 30 to about 50 wt % of glass short fiber reinforcing material are added to a polyamide base material, which is a basis resin.

The reinforcing frame 120 reinforces a portion having low stiffness of the main frame 110. The reinforcing frame 120 is partially coupled to an outside of the main frame 110. In detail, two reinforcing frames 120 are provided and coupled to both sides of the main frame 110 in a shape surrounding a middle portion and a lower end portion of the sides of the main frame 110. That is, the reinforcing frame 120 partially reinforces and supports the main frame along a longitudinal direction to solve a limitation in that stiffness may be weakened in a direction perpendicular to the longitudinal direction when only the glass fiber is used. In this case, the reinforcing frame has a streamlined structure corresponding to that of the main frame.

In the present invention, the reinforcing frame 120 is formed of a carbon fiber, and more particularly, is formed of a carbon fiber in which carbon continuous fiber reinforcing material are added to a thermoplastic acryl base material, which is a basis resin.

As described above, the present invention is technologically characterized in that the main frame 100 defining a total structure of the seat frame 100 is formed of a glass fiber, and the reinforcing frame 120, which is partially applied to reinforce stiffness of the main frame 100, is formed of a carbon fiber.

That is, although it may be considered that an entire main frame 110 is formed of a carbon fiber, carbon fiber is very expensive to increase in manufacturing costs, and thus it is difficult to be commercialized. Accordingly, in the present invention, a glass fiber, which is much cheaper than a carbon fiber, is adopted as a raw material of the main frame 110, and the reinforced frame 120 formed of carbon fiber reinforces a portion having low stiffness of the main frame 110, thereby reducing manufacturing costs and securing sufficient stiffness.

In relation to this, the main frame 110 and the reinforcing frame 120 may have a ⊏-shaped cross-section as illustrated in FIG. 5. In detail, when the frame has a flat structure as those of conventional arts, the frame may be structurally weak due to a lack of torsional stiffness. Thus, so as to solve the insufficient torsional stiffness, in the present invention, the main frame 110 and the reinforcing frame are formed in a ⊏-shaped cross-section so that a section modulus proportional to stiffness is maximized.

For reference, the test specifications related to a torsional stiffness measurement of a seat frame is about 4 mm or less. The seat frame having a flat structure according to the conventional art may not meet the test specifications due to displacement of about 4.8 mm generated when a torsional load is applied. However, according to the present invention, since displacement of about 1.4 mm is generated, a superior structural performance against torsion may be achieved.

In this case, multiple reinforcing ribs 111 may be horizontally disposed on an inner circumferential surface of the main frame 110 so as to further improve stiffness as illustrated in FIG. 6.

By the way, the main frame 110 having the above-described ⊏-shaped cross-section is inserted into an inner circumferential surface of the reinforcing frame 120 having the same cross-section structure. As described above, when the main frame 110 and the reinforcing frame 120 having ⊏-shaped cross-sections are inserted and coupled to each other, stiffness in a direction perpendicular to a longitudinal direction may be improved.

In this case, the main frame 110 and the reinforcing frame 120 may be coupled to each other by rivets 112 as illustrated in FIG. 1. That is, in a state where the main frame 110 is inserted into the reinforcing frame 120, both sides of main frame 110 and the reinforcing frame 120 are respectively coupled by the rivets 112 to improve a coupling force. According to this structure, the rivets may be provided to increase the coupling force between the main frame 110 and the reinforcing frame 120, thereby increasing structural stiffness of the frame.

The rivet structure according to the present invention may be manufactured as follows. That is, a reinforcing frame in which holes for the rivets are defined along a longitudinal direction is seated on a mold of the main frame. Then, when an injection molding solution such as a glass fiber composite material solution is injected into the mold to perform injection-molding, the main frame is formed, and the injection molding solution is flowed out of the holes for the rivets of the reinforcing frame. Here, the flowed injection molding solution is molded to fit a shape of each of the rivets of the mold.

For reference, although a case in which three rivets 112 are coupled to the frame is described for convenience in description, the number of rivets is not limited thereto. For example, the number of rivets is properly adjusted in consideration of desired structural stiffness.

The hybrid seat frame for the vehicle constituted as described above is fixed to a vehicle body by coupling a bolt (not shown) to a coupling hole 113 defined in a lower end of the seat frame 100. However, since the seat frame 100 according to the present invention is formed of glass fiber and carbon fiber, mounting portions through which the frame is mounted on the vehicle may be locally weak.

Thus, to solve such limitation, a coupling tool 114 formed of steel may be disposed on the coupling holes 113. Thus, the coupling tool 114 formed of steel having a relatively high stiffness may support the load to secure further tight fixing force.

According to the present invention, each of the main frame formed of glass fiber and the reinforcing frame formed of carbon fiber may have the ⊏-shaped cross-section and be inserted and coupled to each other, thereby increasing stiffness in a direction perpendicular to the longitudinal direction and torsional stiffness.

Also, the glass fiber that is cheaper than the carbon fiber may be adopted as the raw material of the main frame to make mass-production possible with low manufacturing costs and to reduce weight of the frame thereby improving fuel efficiency.

The exemplary embodiments of the present invention were described in detail with reference to the accompanying drawings. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:
1. A hybrid seat frame for a vehicle comprising:
a main frame formed of glass fiber and having a pair of supports vertically arranged at both sides of the main frame; and a reinforcing frame coupled to each support of the main frame, the reinforcing frame being formed of carbon fiber, wherein each support of the main frame and the reinforcing frame respectively has a ⊏ -shaped cross-section which has an open front and a closed rear, wherein each support of the main frame is inserted into an inner circumferential surface of the reinforcing frame through the open front of the reinforcing frame, wherein the reinforcing frame has holes arranged along a longitudinal direction of the reinforcing frame, wherein the main frame includes rivets each inserted into each hole of the reinforcing frame, wherein the rivets are formed of the glass fiber and molded with the main frame by an injection molding solution flowed into the holes of the reinforcing frame when performing injection molding of the main frame.

\* \* \* \* \*